Figure 1:
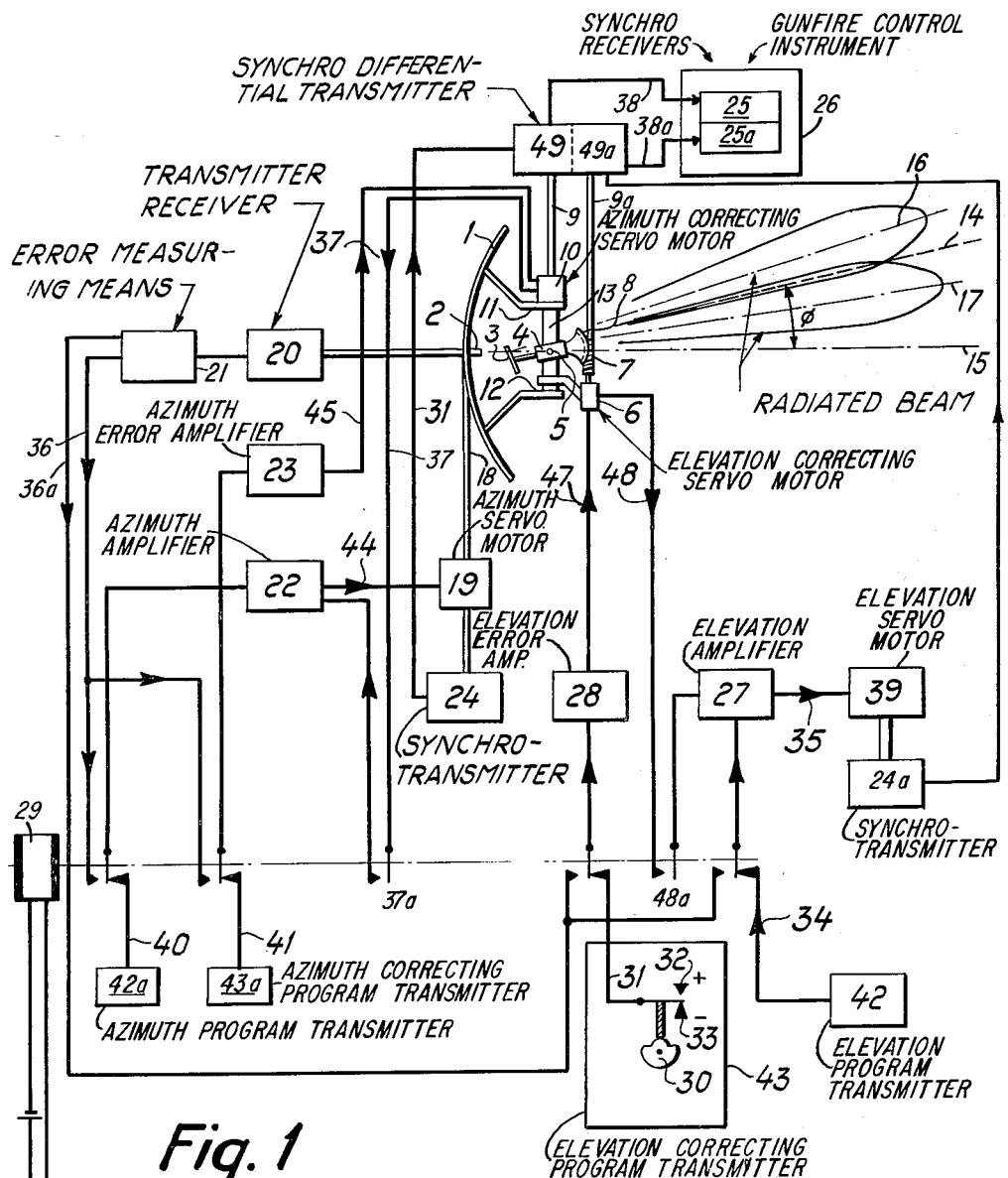

INVENTORS
ERNST VON SEGEBADEN
GUNNAR WINKLER
HARRY CLAESSON

Sept. 5, 1961   E. VON SEGEBADEN ET AL   2,999,235
RADAR SEARCHING AND TRACKING DEVICES
Filed Dec. 16, 1955   3 Sheets-Sheet 2

INVENTORS
ERNST VON SEGEBADEN
GUNNAR WINKLER
HARRY CLAESSON
BY Harry Claesson
ATTORNEY United States Patent Office 2,999,235
Patented Sept. 5, 1961

1

2,999,235
RADAR SEARCHING AND TRACKING DEVICES
Ernst von Segebaden, Drottningholm, Gunnar Winkler, Bromma, and Harry Claesson, Sportstugevagen 4, Danderyd, Sweden; said von Segebaden and said Winkler assignors to said Claesson
Filed Dec. 16, 1955, Ser. No. 553,618
13 Claims. (Cl. 343—7.4)

This invention relates to automatic radar searching and tracking devices, and more particularly to improvements in the antenna control system. This application is a continuation-in-part of our application Serial No. 436,619 filed June 14, 1954 for "Regulating Devices for Servo Systems," now abandoned.

To obtain good performance of a modern fire control radar, it is necessary to have a very narrow beam, which causes scanning during the searching operation to be a difficult task. In radar tracking systems of the type described in U.S. Patent No. 2,473,175 to Ridenour a directive beam or lobe is rotated about a given axis of orientation, the scanning axis, with the beam axis inclined to the axis of orientation at an acute, fixed angle. In such systems the entire antenna system must be moved when searching within an area larger than that covered by the cone enclosing the rotated beam. Because of the comparatively large amount of inertia for the entire antenna system, searching in such a large area cannot be provided as rapidly as desired and the accuracy in the tracking of targets will not be as good as requested.

An object of the present invention is to provide a radar system having an improved antenna system to overcome the main disadvantage of the system described in the above mentioned patent to Ridenour, viz, the necessity of moving the entire antenna system when searching in a comparatively large area. This is obtained by using an improved scanning means enabling the scanning axis to be deviated as well in azimuth as in elevation relative to a given axis of orientation which may consist of the axis of a directive antenna means, for example the axis of the parabolic surface of a paraboloidal reflector, so as to enable scanning within a considerable area without moving the entire antenna system, but solely the scanning means having a negligible inertia.

Another object of the present invention is to provide a novel antenna system comprising a combined control and correcting system, which permits the use of a narrow beam from the radar antenna to provide very good tracking and as well effective scanning during the searching operation.

A further object of this invention is to provide a novel antenna control system in combination with the normal lobe scanning system wherein the antenna control system comprises means for tilting the radiating member in the focal point or in close vicinity of said point, which hereinafter will be referred to as the focal point, of the radiant energy focusing means in order to make scanning possible in a larger angle than is possible at normal lobe scanning.

A further object of this invention is to provide a novel antenna system having three physically different means for effecting deviation of the radiated beam whereby a lobe scanning means and a low inertia scanning means are combined to provide good accuracy in tracking, and a third scanning means having a comparatively high mo-

2 ment of inertia and adapted to be moved through relatively larger angles is provided to achieve the requisite flexibility for adequate scanning during the searching operation.

Figure 2:
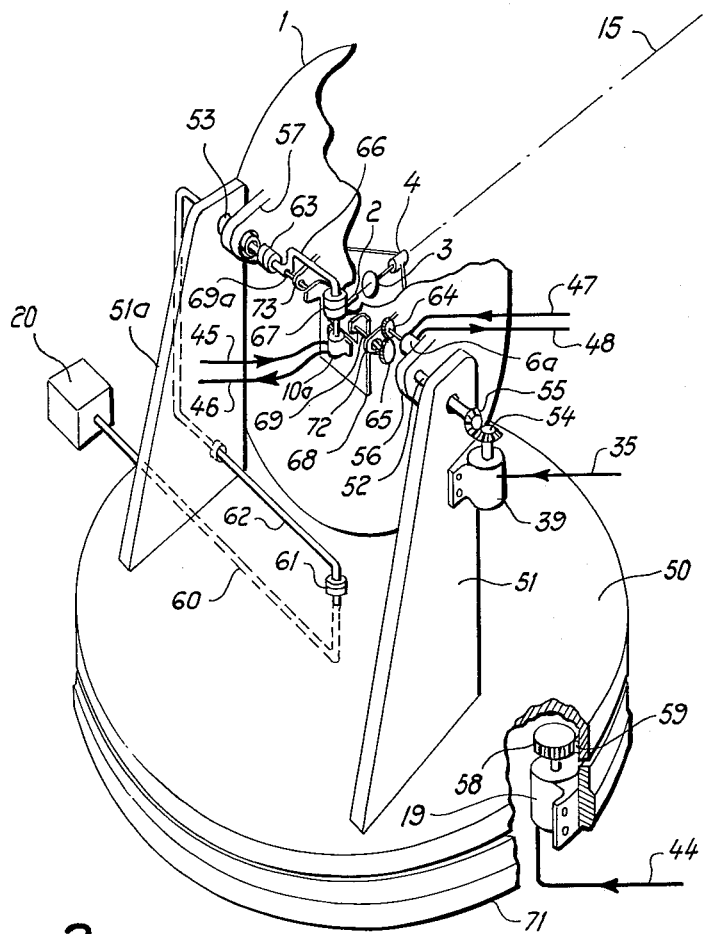
Figure 3:
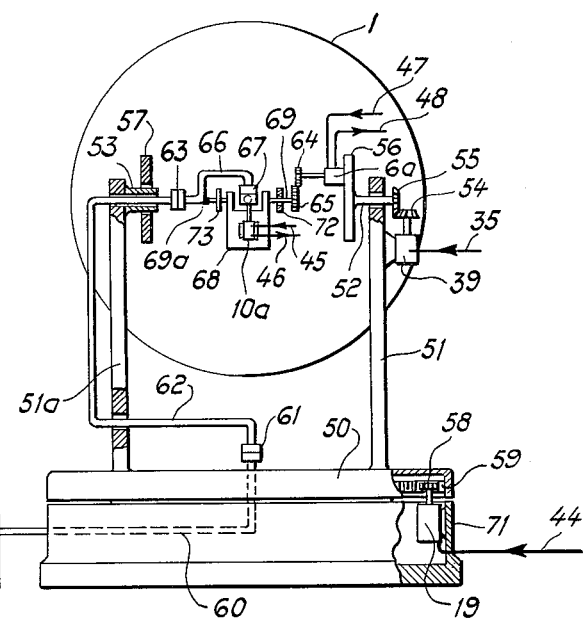
Figure 4:
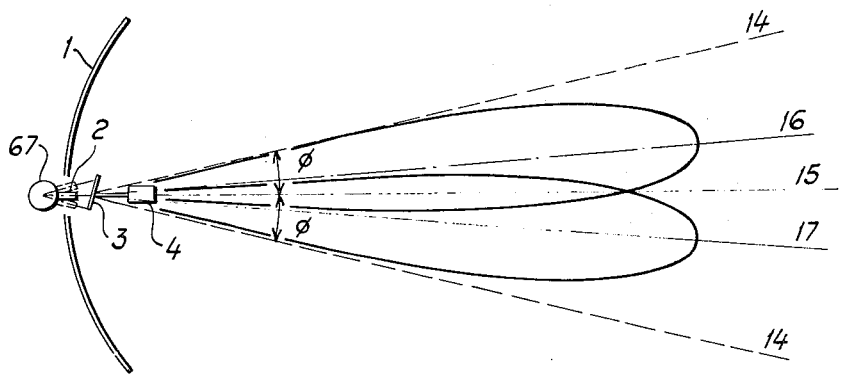

These and other objects of the invention will become more fully apparent from the claims, and from the description as it proceeds in connection with the appended drawings, wherein:

FIGURE 1 shows an embodiment of the invention having a movable spinning motor device at the focal point of the antenna system; and FIGURES 2, 3 and 4 show a second embodiment of the invention having a movable radiating wave guide placed at the focal point of the antenna.

Referring now to FIGURE 1, the radiant energy focusing means comprises a parabolic reflector 1 having at its center near the focal point a radiating wave guide 2 and lobe scanning means comprising disc 3 mounted in front of wave guide 2 on a shaft rotated by spinning motor 4. The highly reflective surface of disc 3 facing wave guide 2 forms an oblique angle relative to the motor shaft, and wave guide 2 and rotating disc 3 together form a radiating member giving a predetermined lobe scanning angle in a manner well known in the art. The lobe scanning means serves as means for scanning within a cone which, as shown in FIGURE 1, has its apex at the focal point of parabola 1, its altitude along dotted line 14 and its slant height along lines 16 and 17 representing the beam axis of the radiated beam in two different elevation positions.

Motor 4 is pivotally mounted about axis 5 to be adjustably positioned along with plate 8 having a gear segment with teeth disposed along a pitch circle having its center at pivot axis 5. Servo motor 6, supported by bracket 6a to be rigid relative to spinning motor 4, drives worm gear 7 which meshes with the gear teeth on gear segment 8.

Spinning motor 4 is mounted for pivotal movement about a vertical axis through motor support shaft 13 whereby the azimuth of motor 4 may be adjustably controlled by means of correcting servo motor 10. Motor support 13 is journalled in bearings 11 and 12 and carries spinning motor 4 and elevation correcting servo motor 6. Support 13 is made of lightweight material to have a relatively low moment of inertia and controls the position of spinning motor 4 about a vertical axis to control its azimuth position in accordance with the energization of servo motor 10.

The center line 14 of the lobe scanning means, which is commonly referred to as the scanning axis, is deviated in elevation through an angle $\phi$ relative to the axis 15 of the parabolic surface of the parabola 1, hereinafter referred to as the antenna axis 15, or axis of orientation, through control of servo motor 6. Scanning axis 14 may be deviated in azimuth through an agle $\psi$ by means of correcting servo motor 10, where $\psi$ denotes the angle between antenna axis 15 and the vertical projection of scanning axis 14 to a horizontal plane through axis 15. Elevation correcting servo motor 6 and azimuth correcting servo motor 10 together with their associated parts comprise a bearing and drive means which has comparatively low inertia to control center line 14 of the lobe scanning means.

The entire antenna system is mounted for turning about a vertical axis along shaft 18 and driven by the main servo motor 19. The structure utilized for this purpose is conventional and may be similar to that shown in FIGURE 2. Parabola 1 and all its associated parts including correcting servo motors 6 and 10 are mounted for pivotal movement about a horizontal axis (not shown in FIGURE 1) in accordance with the energization of main elevation servo motor 39. The actual structure used is conventional and may be similar to that shown in FIGURE 2.

A transmitter-receiver 20 and error measuring means 21 are provided for generating both azimuth and elevation correcting error voltages, determined by the misalignment of the axis 14 with the direction of pointing to a remote object, to operate azimuth and elevation servo motors so as to seek the alignment requested. These devices and their manner of operation are of known type as disclosed for example in U.S. Patent No. 2,473,175. For the control in azimuth: an amplifier controller 22 is provided for amplification of azimuth error quantities and connection to main azimuth servo motor 19 through lead 44; and a second amplifier controller 23 is provided for amplification of azimuth error quantities and connection to correcting servo motor 10 through lead 45. A synchro transmitter 24 which is coupled to shaft 18 transmits a signal corresponding to the direction of antenna reflector 1 to one input of synchro differential transmitter 49. Shaft 9, which turns with azimuth correcting servo motor 10, is also connected to an input of synchro differential transmitter 49 to provide a signal proportional to the error deviation angle $\psi$ in azimuth. In synchro differential transmitter 49 the values of the antenna azimuth angle and the deviation correction angle $\psi$ are summed and transmitted to a synchro receiver 25 in the gunfire control instrument 26.

The main azimuth servo motor 19 and amplifier 22 are conventional parts of the control system which inherently have a relatively large moment of inertia while the correcting azimuth servo motor 10 with the amplifier 23 are parts of a correcting system in accordance with the present invention having a small moment of inertia.

For elevation adjustments, a similar system is provided consisting essentially of a main elevation servo motor 39 connected to amplifier controller 27 through lead 35 and a correcting system having a low moment of inertia comprising correcting servo motor 6 connected to amplifier controller 28 through lead 47. A synchro transmitter 24a which is coupled to the elevation servo motor 39 transmits a signal corresponding to the direction of antenna reflector 1 to the input of elevation synchro differential transmitter 49a. Shaft 9a, which turns with the elevation correcting servo motor 6 is also connected to an input of elevation synchro differential transmitter 49a to provide an output signal proportional to the error deviation signal $\phi$ in elevation on lead 38a. In synchro differential transmitter 49a, the values of the antenna elevation angle and the deviation correction angle $\phi$ are summed and transmitted to an elevation synchro receiver 25a in the gunfire control instrument 26.

Switching means consisting of relay 29 operated by switch 29a is provided for establishing different types of antenna control circuits for use when the radar system is scanning or searching for targets and when the system is tracking a particular target object after it has been localized in the scanning beam.

The main elevation servo motor 39 which is controlled by amplifier controller 27 is adapted to be controlled manually or automatically from program transmitter 42 over lead 34 to permit manual control of the scanning operation while searching in a conventional manner. The main azimuth servo motor 19 is controlled through control amplifier 22 which in a similar manner is controlled manually or automatically by program transmitter 42a connected to lead 40 to permit manual control of the scanning operation while searching in a conventional manner.

Cam 30, which is driven by an electrical motor turning at a substantially constant speed, alternately connects lead 31 which is connected to the input circuit of amplifier controller 28 for correcting vertical servo motor 6, to a positive voltage on contact 32 and to a negative voltage on contact 33 to cause periodic vertical deviation or tilt of spinning motor 4 during searching operation. This arrangement increases the vertical region which can be searched when the antenna parabola 1 is controlled to scan in a horizontal pattern.

Amplifier controller 23 for azimuth correcting servo motor 10 may also be controlled by program transmitter 43a which is similar to transmitter 43 and which is connected to lead 41. When antenna parabola 1 is scanning a vertical segment, the effect of such program transmitter connected to lead 41 is to increase the azimuth angle which is scanned without turning the parabola 1 by main azimuth servo motor 19.

To perform tracking operation relay 29 is operated by setting switch 29a into tracking position, whereby the contacts are transferred to an alternate position from that shown in the drawings. This disconnects the elevation program transmitters 42 and 43 and corresponding azimuth program transmitters 42a and 43a connected to leads 40 and 41 and connects the output signals on leads 36a and 36 from error measuring means 21 to control all servo amplifiers 27, 28, 22 and 23. Elevation servo motors 39 and 6 and azimuth servo motors 19 and 10 are then connected for automatic tracking of a particular target which has been localized by the conically scanning beam. The target object must be inside of the conical beam at the point of time when relay 29 is energized in order that the error or correcting signal from error measuring means 21 is available to be supplied to the amplifier controllers.

To describe the operation of the system, it will be assumed that the radar system is first searching for an object in space, and that the lobe scanning device with its spinning motor 4 is functioning. Azimuth servo motor 19 drives the antenna system slowly around the shaft 18 and at the same time spinning motor 4 with rotatable disc 3 will be rapidly tilted about shaft 5 within certain elevation angles $\phi$ determined by program transmitter 43, so that an area defined by the rotation in azimuth of the entire antenna system and the elevational movement of spinning motor 4 and, thus, of the scanning axis 14 will be scanned just as if a wide angle search beam were being used. Main azimuth servo motor 19 may be driven continuously in one direction or back and forth in a certain sector from program transmitter 42a connected to lead 40. The elevation angle $\phi$ for searching may be increased or decreased, if desired, by varying the signals from program transmitter 43. The movement of the spinning motor 4 about shaft 5 is very rapid due to the negligible inertia of motor 4 and disc 3 and a large searching area can be supervised in a short time.

Optionally, main elevation servo motor 39 connected through lead 35, associated contacts on relay 29 and lead 34 to program transmitter 42 may be controlled to scan different regions in elevation. If a vertical region small in azimuth is to be searched, spinning motor 4 and disc 3 can be rapidly deviated in azimuth by means of azimuth correcting servo motor 10 and control amplifier 23 which is connected through lead 41 to program transmitter 43a. Searching may obviously be performed in three different manners, viz. one by means of the scanning means resulting solely from the operation of spinning motor 4 and disc 3 whereby the radiated beam will be rotated about scanning axis 14 which is maintained in a fixed, desired direction, the second by means of correcting servo motors 6 and 10 which may cause spinning motor 4 to deviate scanning axis 14 so as to scan a region defined by the limits of the azimuth deflection $\psi$ and elevation deflection $\phi$ provided by the correcting servo motors 10 and 6, respectively; and the third by means of the conventional control servo motors 19 and 39 which control movement of parabola 1 in azimuth and elevation, respectively.

When a target object to be tracked is localized in a searching operation with switch 29a in searching position, relay 29 is then operated by automatically or manually setting switch 29a in tracking position. Relay 29 then disconnects the searching program transmitters 42 and 42a and connects the servo systems for automatic tracking.

The output signal on lead 36 from error measuring means 21 is connected to be amplified in azimuth amplifier controller 22 and supplied to the main azimuth servo motor 19 for adjustment of the antenna system in azimuth in a manner as is disclosed in Patent No. 2,473,175. In a corresponding manner, the main elevation servo motor 39 is controlled by the output signal on lead 36a from error measuring means 21 through amplifier controller 27.

Main azimuth servo motor 19 adjusts synchro transmitter 24 for transmission of the azimuth direction of the axis of orientation of parabola 1 to synchro differential transmitter 49 for the gunfire control instrument synchro receiver 25. However, due to the inherently high inertia of the antenna system controlled by main azimuth servo motor 19, undesirable delays occur before changes in target position are received by synchro differential transmitter 49 from synchro transmitter 24.

In accordance with the present invention, the error correcting signals on lead 36 are also supplied through control amplifier 23 to azimuth correction motor 10 which has a much smaller inertia to thus rapidly correct the position of spinning motor 4 through rotation of shaft 13 by azimuth correcting servo motor 10. Shaft 9 also turns with motor support shaft 13 and is connected to an input of synchro differential transmitter 49 whereby the azimuth output signal from synchro differential transmitter 49 faithfully follows scanning axis 14 as rapidly as correcting azimuth servo motor 10 controls scanning axis 14.

In order that antenna parabola 1 is continuously moved in the proper direction to follow the target, an output signal from azimuth correcting servo motor 10 is connected through lead 37 and relay contacts 37a to amplifier controller 22 for the main azimuth servo motor 19. The magnitude of the signal on lead 37 may be proportional to the angle of deviation of servo motor 10 from a central reference position. This results in antenna axis 15 of antenna parabola 1 moving into a coinciding position with scanning axis 14.

The gunfire control instrument 26 has a similar elevation synchro differential transmitter 49a and vertical synchro receiver 25a which operate in an analogous manner to permit the beam axis 14 to follow rapid changes in elevation of the target position through operation of the low inertia elevation correcting servo motor 6 and main elevation servo motor 39 whereby antenna parabola 1 may be titlted in elevation so that axis of orientation 15 coincides with the scanning axis 14. A feedback signal from servo motor 6 on lead 48 is connected through contacts 48a to amplifier controller 27 for main elevation servo motor 39. This connection is important because when the scanning axis 14 is on the target, the output signal on lead 36 from error measuring means 21 is zero and without the signal on lead 48, there would then be no control signal for amplifier controller 27 which would serve to move axis of orientation 15 into coincidence with scanning axis 14.

As a modification, the connection by leads 36 and 36a from the output of the error measuring means 21 directly to main servo amplifier controllers 22 and 27 respectively may be dispensed with whereby the error signal on leads 36 and 36a is applied directly to the low inertia error correcting servo motor amplifiers 23 and 28 respectively. In this embodiment, the main servo motors 19 and 39 receive their correcting signals solely through the output lead 37 from azimuth correcting servo motor 10 to main azimuth amplifier controller 22 and from elevation correcting servo motor 6 through lead 48 to main elevation amplifier controller 27.

Thus the correcting system will in rapid dynamic operation give more rapid response values than the control system which contains only the heavy main antenna system and main servo motors 19 and 39 which have inherently large moments of inertia as have been used in prior art devices of this type. As the scanning axis 14 is in every moment directed closely toward the target object being tracked, the output signal on leads 38 and 38a from the synchro differential transmitter 49 will also at every moment have a similar correct value.

FIGURES 2, 3 and 4 show a further embodiment of the present invention in which the reference numerals used in FIGURE 1 refer to corresponding parts in this embodiment. Because of the identity of operation, only the differences will be described in detail.

Spinning motor 4 with its rotating disc is rigidly secured to antenna paraboloid 1 as is shown in FIGURES 2 and 4. Wave guide 2 which passes through antenna paraboloid 1 near its focal point is mounted to be moved by correcting servo motors in azimuth and in elevation which have reference numbers 10a and 6a respectively in FIGURES 2, 3 and 4 and which correspond in function to azimuth correcting servo motor 10 and elevation correcting servo motor 6 of the embodiment illustrated in FIGURE 1.

In the embodiment shown in FIGURES 2, 3 and 4, the entire movable antenna structure is mounted on base 71 and comprises member 50 mounted for rotation about a vertical axis to move the entire antenna device in azimuth by means of main servo motor 19 with pinion gear 58 which meshes with annular ring gear 59 on base 71. Supports 51 and 51a are mounted on member 50 and contain bearings for shafts 52 and 53 which are secured into brackets 56 and 57 on antenna parabola 1. Main elevation servo motor 39 is mounted on support 51 and drives shaft 52 through bevel gears 54 and 55 to control the elevation deviation of antenna parabola 1.

Transmitter-receiver box 20 is connected to the antenna through a fixed wave guide 60, a rotating point 61 of known type and wave guide part 62 which is fixed in support 51a as clearly shown in FIGURE 3. Wave guide 66 is coupled to wave guide 62 through rotating joint 63 and is coupled to radiation wave guide portion 2 through rotating joint 67.

Mounting frame 68 is provided for carrying azimuth correcting servo motor 10a and is mounted for pivotal movement about shafts 69 and 69a which in turn are held in position by bearings extending through brackets 72 and 73 on antenna paraboloid 1. Antenna section 66 and rotating joint 67 are both supported in such manner relative to frame 68 that all these parts pivot about the axis of shafts 69 and 69a. Elevation correcting servo motor 6a is secured to bracket 56 on antenna paraboloid 1 and drives gear wheel 64. Mating gear 65 is journalled in bracket 62 and rigidly connected to frame 68 to thereby control the elevation position of radiation wave guide 2.

Radiation wave guide 2 is fixed on the lower portion of rotating joint 67 and is mechanically coupled to servo motor 10a in order to control movement of radiation wave guide 2 in azimuth.

The operation of the embodiment described in FIGURES 2–4 is identical to that described in connection with FIGURE 1. As is apparent from the foregoing, the embodiments differ from each other mainly with respect to the means for correcting the deviation of the scanning axis 14. In the embodiment according to FIGURE 1, this deviation is obtained by moving spinning motor 4 with its rotating disc about perpendicular axes whereas in the embodiment according to FIGURES 2–4, the corresponding deviation is obtained by moving a small end portion of the radiating wave guide 2. In both embodiments, the correcting servo system utilizes apparatus having low weight and therefore a small moment of inertia relative to the weight and moment of inertia for the entire antenna apparatus. Of the two embodiments, that shown in FIGURES 2–4 has a smaller moment of inertia for the correcting system than that of FIGURE 1 in which the spinning motor is moved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a radar system for searching and tracking objects in space, a radiant energy focusing means with a focal point and an axis of orientation, first aizmuth and elevation angle adjusting means for moving said radiant energy focusing means in any direction, an energy radiating and receiving member located at said focal point for producing a beam along a beam axis determined by said radiating and receiving member, means for operating said radiating and receiving member so as to rotate said beam axis about a scanning axis inclined to the beam axis, and second azimuth and elevation angle adjusting means for adjusting said radiating and receiving member so as to deviate said scanning axis relative to said axis of orientation.

2. In a radar system for searching and tracking objects in space, a radiant energy focusing means with a focal point and an axis of orientation, first azimuth and elevation angle adjusting means for moving said radiant energy focusing means in any direction, an energy radiating and receiving member located at said focal point for producing a beam along a beam axis determined by said radiating and receiving member, means for operating said radiating and receiving member so as to rotate said beam axis about a scanning axis inclined to the beam axis, and second azimuth and elevation angle adjusting means for adjusting said radiating and receiving member, a program transmitter for supplying program signals to said second azimuth and elevation angle adjusting means so as to deviate said scanning axis relative to said axis of orientation.

3. In a radar system for searching and tracking objects in space, a radiant energy focusing means with a focal point and an axis of orientation, first azimuth and elevation angle adjusting means for moving said radiant energy focusing means in any direction, an energy radiating and receiving member enabling lobe scanning located at said focal point for producing a beam along a beam axis determined by said radiating and receiving member, means for operating said radiating and receiving member so as to rotate said beam axis about a scanning axis inclined to the beam axis, second azimuth and elevation angle adjusting means for adjusting said radiating and receiving member so as to deviate said scanning axis relative to said axis of orientation, a receiver and an error measuring means connected to said radiating and receiving member for amplifying the received lobe scanning signals and for generating azimuth and elevation error signals in dependence on the magnitude of lobe signals received from an object, a servo system having an input connected to said error measuring means and supplied with error signals and having an output connected to an input of said second azimuth and elevation angle adjusting means to obtain automatic tracking of objects in space, and a signal transmitter system connected to an output of said second azimuth and elevation angle adjusting means for producing a signal corresponding to the angular direction of said scanning axis relative to said axis of orientation.

4. In a radar system for searching and tracking objects in space, a radiant energy focusing means with a focal point and an axis of orientation, first azimuth and elevation angle adjusting means for moving said radiant energy focusing means in any direction, a lobe scanning means having an energy radiating and receiving member located at said focal point for producing a beam along a beam axis determined by said radiating and receiving member, means for operating said radiating and receiving member so as to rotate said beam axis about a scanning axis inclined to the beam axis, second azimuth and elevation angle adjusting means for adjusting said radiating and receiving member so as to deviate said scanning axis relative to said axis of orientation, a program transmitter for supplying program signals to said second azimuth and elevation angle adjusting means for adjusting said radiating and receiving member so as to deviate said scanning axis in any direction relative to said axis of orientation, a receiver and an error measuring means connected to said radiating and receiving member for amplifying the received lobe scanning signals and for generating azimuth and elevation error signals in dependence on the magnitude of lobe signals received from an object, a servo system having an input connected to said error measuring means and supplied with error signals and having an output connected to an input of said second azimuth and elevation angle adjusting means to obtain automatic tracking of objects in space, and a signal transmitter system connected to an output of said second azimuth and elevation angle adjusting means for producing a signal corresponding to the angular direction of said scanning axis relative to said axis of orientation, and switching means for disconnecting said program transmitter from said second azimuth and said elevation angle adjusting means and for connecting said receiver and said error measuring means to said servo system in order to change over the radar system from searching to automatic tracking of an object.

5. In a radar system for searching and tracking objects in space, a radiant energy focusing means with a focal point and an axis of orientation, first azimuth and elevation angle adjusting means for moving said radiant energy focusing means in any direction, lobe scanning means with a radiating and receiving member located at said focal point for producing a beam along a beam axis determined by said radiating and receiving member, means for operating said radiating and receiving member so as to rotate said beam axis about a scanning axis inclined to the beam axis, said radiating and receiving member comprising a radiating wave guide and a reflecting disc mounted in front of the radiating member on the shaft of a spinning motor and rotated by said motor, the surface of the disc forming an angle relative to the shaft determining the direction of said beam axis, a second azimuth and elevation angle adjusting means for displacing said motor with said disc at the focal point for deviating the scanning axis relative to said axis of orientation of the radiant energy focusing means.

6. In a radar system for searching and tracking objects in space, a radiant energy focusing means with a focal point and an axis of orientation, first azimuth and elevation angle adjusting means for moving said radiant energy focusing means in any direction, lobe scanning means with a radiating and receiving member located at said focal point for producing a beam along a beam axis determined by said radiating and receiving member, means for operating said radiating and receiving member so as to rotate said beam axis about a scanning axis inclined to the beam axis, said radiating and receiving member comprising a radiating wave guide and a reflecting disc mounted in front of the wave guide on the shaft of a spinning motor and rotated by said motor, the surface of the disc forming an angle relative to the shaft, a second azimuth and elevation angle adjusting means for displacing said radiating wave guide at the focal point for deviating said scanning axis relative to said axis of orientation of the radiant energy focusing means.

7. In a radar system for searching and tracking objects in space, a radiant energy focusing means with a focal point and an axis of orientation, first azimuth and elevation angle adjusting means for moving said radiant energy focusing means in any direction, lobe scanning means with a radiating and receiving member at said focal point for producing a beam along a beam axis determined by said radiating and receiving member, means for operating said radiating and receiving member so as to rotate said beam axis about a scanning axis inclined to said beam axis, a receiver and an error measuring means connected to the lobe scanning means for amplifying the received lobe scanning signals and for generating azimuth and elevation error signals in dependence on the magnitude of lobe signals reflected from an object, means for supplying the error signals to two different branches one of which comprises a control system including said first azimuth and elevation angle adjusting means having an input which is supplied with said error signals and an output connected to said radiant energy focusing means for adjusting said radiant energy focusing means in a direction determined by said error signals, the other branch comprising a correcting system including a second azimuth and elevation angle adjusting means having an input which is supplied with said error signals and an output connected to the lobe scanning means for adjusting said lobe scanning means in a direction determined by said error signals, said lobe scanning means having a considerably smaller moment of inertia than said control system connected to the radiant energy focusing means, and a means for adding the output azimuth signal from said control system to the output azimuth signal from said second azimuth and elevation angle adjusting means, and for adding the output elevation signal from said control system to the output elevation signal from said second azimuth and elevation angle adjusting means.

8. In a radar system for searching and tracking objects in space, a radiant energy focusing means with a focal point and an axis of orientation, first azimuth and elevation angle adjusting means for moving said radiant energy focusing means in any direction, lobe scanning means with a radiating and receiving member at said focal point for producing a beam along a beam scanning axis determined by said radiating and receiving member, means for operating said radiating and receiving member so as to rotate said beam axis about a scanning axis inclined to said beam axis, said radiating and receiving member comprising a radiating wave guide and a reflecting disc mounted in front of the radiating wave guide on the shaft of a spinning motor and rotated by said motor, the surface of the disc forming an angle relative to said shaft, a second azimuth and elevation angle adjusting means for displacing said radiating wave guide at the focal point for deviating said scanning axis relative to said axis of orientation of the radiant energy focusing means, a receiver and an error measuring means connected to the lobe scanning means for amplifying the received lobe scanning signals and for generating azimuth and elevation error signals in dependence on the magnitude of said received lobe scanning signals, a correcting servo system having an input connected to said error measuring means and supplied with the error signals and having an output connected to said second azimuth and elevation angle adjusting means for displacing last mentioned adjusting means so as to obtain automatic tracking of an object in space.

9. In a radar system for searching and tracking objects in space according to claim 8, a control servo system having an input connected to the output of the error measuring means and having an output connected to the first azimuth and elevation angle adjusting means to adjust the setting of the radiant energy focusing means in accordance with the error signals at the output of said error measuring means, the correcting servo system having a considerably smaller moment of inertia than said control system including the radiant energy focusing means and means for adding the output azimuth value of said control servo system to the output azimuth value of the second azimuth and elevation angle adjusting means, and for adding the output elevation value from said control servo system to the output elevation value from said second azimuth and elevation angle adjusting means.

10. In a radar system for searching and tracking objects in space according to claim 8, a program transmitter for supplying program signals to the second azimuth and elevation angle adjusting means for deviating the scanning axis relative to the axis of orientation of the radiant energy focusing means, and switching means for disconnecting said program transmitter from said second azimuth and elevation angle adjusting means and for connecting the receiver and error measuring means to said correcting system in order to change over the radar system from searching to automatic tracking of an object.

11. In a radar system for searching and tracking objects in space, a radiant energy focusing means with a focal point and an axis of orientation, first azimuth and elevation angle adjusting means for moving said radiant energy focusing means in any direction, lobe scanning means with a radiating and receiving member at said focal point for producing a beam along a beam scanning axis determined by said radiating and receiving member, means for operating said radiating and receiving member so as to rotate said beam axis about a scanning axis inclined to said beam axis, a first program transmitter connected to said first azimuth and elevation angle adjusting means and generating signals controlling the movement of said radiant energy focusing means, second azimuth and elevation angle adjusting means for deviating said scanning axis relative to said axis of orientation, a second program transmitter connected to said second azimuth and elevation angle adjusting means to deviate said scanning axis relative to said axis of orientation in accordance with a predetermined program, a receiver and an error measuring means connected to the lobe scanning means for amplifying the received lobe scanning signals and for generating azimuth and elevation error signals at the output of said error measuring means in dependence on the magnitude of the received lobe signals, means for supplying the error signals to two separate branches, one of which comprises a control servo system including said first azimuth and elevation angle adjusting means, the input of said control servo system being supplied with said error signals and the output of said control servo system being connected to said radiant energy focusing means to move said radiant energy focusing means in any direction in accordance with the error signals, the other branch comprising a correcting servo system including said second azimuth and elevation angle adjusting means, said correcting servo system having an input supplied with said error signals and an output connected to the lobe scanning means to deviate the scanning axis in accordance with said error signals, and said correcting servo system having a considerably smaller moment of inertia than said control servo system, a device for adding output azimuth signals from said control servo system with output azimuth signals from said correcting system and for adding output elevation signals from said control servo system with output elevation signals from said correcting system, and switching means for disconnecting said program transmitters from said first and second azimuth and elevation angle adjusting means and for connecting receiver and said error measuring means to said two separate branches in order to change over the radar system from searching operations to automatic tracking operations.

12. In a radar system, a radiant energy focusing means with a focal point and an axis of orientation, lobe scanning means with a radiating and receiving member at said focal point for scanning the lobe about a lobe scanning axis determined by the position of said lobe scanning means, and azimuth and elevation angle adjusting means for operating said lobe scanning means so as to deviate the lobe scanning axis relative to said axis of orientation.

13. In a radar system, a radiant energy focusing means with a focal point and an axis of orientation, lobe scanning means with a radiating and receiving member at said focal point for scanning the determined lobe about a lobe scanning axis by the position of said radiating and receiving member, and azimuth and elevation angle adjusting means for operating said radiating and receiving member so as to deviate the lobe scanning axis relative to said axis of orientation.

References Cited in the file of this patent

UNITED STATES PATENTS 2,452,349     Becker _____ Oct. 26, 1948